United States Patent [19]

Lin et al.

[11] Patent Number: 4,636,388
[45] Date of Patent: Jan. 13, 1987

[54] PREPARING PROTEIN FOR HYDROLYSIS AND PRODUCT

[75] Inventors: Chifa F. Lin, Irvington; Chang R. Lee, Yonkers, both of N.Y.

[73] Assignee: Stauffer Chemical Company, Westport, Conn.

[21] Appl. No.: 683,339

[22] Filed: Dec. 19, 1984

Related U.S. Application Data

[63] Continuation of Ser. No. 562,023, Dec. 14, 1983, abandoned, which is a continuation of Ser. No. 350,845, Feb. 22, 1982, abandoned.

[51] Int. Cl.$^4$ ............................................. A23J 3/00
[52] U.S. Cl. .................................. 426/7; 426/32; 426/41; 426/46; 426/573; 426/656; 426/657; 435/69
[58] Field of Search ................. 426/7, 32, 41, 46, 573, 426/656, 657; 435/69

[56] References Cited

U.S. PATENT DOCUMENTS

| | | | |
|---|---|---|---|
| 2,253,518 | 8/1941 | Hess | 99/210 |
| 2,456,297 | 12/1948 | Melnick | 99/21 |
| 2,489,880 | 11/1949 | Hand et al. | 195/29 |
| 2,502,482 | 4/1950 | Sair et al. | 99/14 |
| 3,220,851 | 11/1965 | Rambaud | 99/98 |
| 3,697,285 | 10/1972 | Faith, Jr. et al. | 99/18 |
| 3,761,353 | 9/1973 | Noe et al. | 195/29 |
| 3,814,816 | 6/1974 | Gunther | 426/46 |
| 3,843,802 | 10/1974 | Puski | 426/46 |
| 3,857,966 | 12/1974 | Feldman et al. | 426/7 |
| 3,928,630 | 12/1975 | Perini | 426/32 |
| 3,950,547 | 4/1976 | Lamar, III et al. | 426/74 |
| 3,970,520 | 7/1976 | Feldman et al. | 195/29 |
| 3,974,294 | 8/1976 | Schwille et al. | 426/32 |
| 4,075,195 | 2/1978 | Roland | 250/119 |
| 4,091,118 | 5/1978 | deRham | 426/46 |
| 4,100,024 | 7/1978 | Adler-Nissen | 195/29 |
| 4,107,334 | 8/1978 | Jolly | 426/7 |
| 4,218,481 | 8/1980 | Chao et al. | 426/60 |
| 4,284,656 | 8/1981 | Hwa | 426/641 |
| 4,293,571 | 10/1981 | Olofsson | 426/42 |

FOREIGN PATENT DOCUMENTS

| | | |
|---|---|---|
| 659731 | 2/1965 | Belgium . |
| 3027511 | 2/1982 | Fed. Rep. of Germany . |
| 3044661 | 4/1978 | Japan ............................ 426/32 |
| 2043651 | 10/1980 | United Kingdom . |

OTHER PUBLICATIONS

Shurtleff et al., The Book of Miso, 1976, Autumn Press Ltd.: Kanagawa-ken, Japan, p. 56.

Cunningham, F. E., et al., "Stabilization of Egg-White Proteins to Pasteurizing Temperatures Above 60°C.", Food Technology, Sep. 1965, pp. 136-141.

Lei, M. G., et al., "Effect of Cysteine on Heat Activation of Soybean Trypsin Inhibitors", J. Agric, Food Chem., vol. 29, No. 6, pp. 1196-1199.

Stadelman, W. J., et al., "Chemistry of Eggs and Egg Products", in: Egg Science and Technology, (Westport, Conn., The Avi Publ. Co. Inc., 1973), pp. 73-77.

Clegg, K. M., et al., "Dietary Enzymic Hydrolysates of Protein with Reduced Bitterness", J. Fd. Technol., 9, 1974, pp. 21-29.

Clegg, K. M., et al., "Production of an Enzymic Hydrolysate of Casein on a Kilogram Scale", J. Fd. Technol. (1974), 9, pp. 425-431.

Technical Brochure, Miles Laboratories, Enzyme Products Division entitled "Takamine ® Brand Fungal Protease" dated 1978.

Miles Laboratories brochure from its Enzyme Products Division entitled "Takamine ® Brand Pancretin 4 N.F. undated.

Krueger, J., "Enzymes", Processed Prepared Foods, May 1979, pp. 96-120.

Lalasidis et al., "Low Molecular Weight Enzyumatic Fish Protein Hydrolysates: Chemical Composition and Nutritive Value", Journal of Agricultural and Food Chemistry, vol. 26, No. 3, May/Jun. 1978, pp. 751-756.

Fujimaki et al., "Applying Proteolytic Enzymes on Soybean", Food Technology, vol. 22, Jul. 1968, pp. 889-893.

Adler-Nissen, J., "Enzymatic Hydrolysis of Food Proteins", Process Biochemistry, Jul./Aug. 1977, pp. 13, 19, 22 and 23.

*Primary Examiner*—Joseph Golian
*Attorney, Agent, or Firm*—Paul J. Juettner

[57] ABSTRACT

A purified protein particularly adapted for enzymatic hydrolysis can be prepared by gelling the protein followed by breaking the gel into particles and washing the particles in sufficient liquid to allow portions of the nonproteinaceous material in the gel matrix to diffuse into the liquid.

36 Claims, No Drawings

PREPARING PROTEIN FOR HYDROLYSIS AND PRODUCT

This is a continuation of application Ser. No. 562,023, filed Dec. 14, 1983, now abandoned, which is a continuation of Ser. No. 350,845, filed Feb. 22, 1982, now abandoned.

BACKGROUND OF THE INVENTION

1. Field of the Invention

The invention relates to processes for purifying proteinaceous solutions for enzymatic hydrolysis, particularly to provide organoleptically desirable protein hydrolysate compositions which can be used for dietary purposes and in particular for hospital diets.

2. The Prior Art

Synthetic or low-residue diet foods have been prepared by the prior art to provide the essential nutritional requirements of humans in an easily digestible form. Such diets are predigested protein which have high nutritional value, preferably low ash, and are primarily designed for pre- or postoperative patients or for patients with digestive problems, such as the incapability of breaking down whole protein in the digestive tract (a sympton of cystic fibrosis). One of the primary problems with respect to such diets is palatability of the product.

It is well known that when proteins are digested with strong acid or alkali or with enzymes, hydrolysis of the protein takes place with the subsequent formation of protein fragments, peptides and amino acids. Fragmented protein materials of this type are desirable products for administration to humans (and animals) with digestive problems.

Of the known means to hydrolyze protein, enzymatic hydrolysis is preferred since it does not destroy essential amino acids that are destroyed by acid or alkaline hydrolysis. However, enzymatic hydrolysis rarely goes to completion and the products of the enzymatic hydrolysis cannot be predicted and frequently the hydrolyzed protein is unsuitable because it contains bitter-tasting peptides. Products of this type to be effective as diets must be organoleptically acceptable. (Dietary Enzymatic Hydrolysates of Protein with Reduced Bitterness, Clegg et al., J. Food Tech. (1974) 9, 21–29).

In U.S. Pat. No. 3,857,966 there is disclosed a method for preparing an egg albumen hydrolysate which does not contain the characteristic egg smell and taste. Egg albumen in a 5% by weight solution whose pH is adjusted to 6.3–6.4 is heated to about 85° C. for about 5 minutes to precipitate the protein. After cooling to room temperature, the precipitate is separated by centrifugation and the supernatant is discarded. The precipitate is resuspended in fresh water at pH 6.3–6.5, homogenized in a Waring blender and centrifuged again, discarding the supernatant. The washing step is repeated once more and the wash precipitate is used to make a 5% protein suspension for hydrolysis.

The protein suspension as prepared above is then heated at an alkaline pH (pH 8–9) at a temperature (95°–10020 C.) and for a period of time (generally about 1 hour) effective to condition the protein for efficient enzymatic hydrolysis. Apparently at this stage residual enzyme inhibitors which remain from prior treatments are destroyed. The enzymatic hydrolysis is then conducted using a two-stage enzyme system of an alkaline microbial protease in the first stage and a blend of neutral microbial protease and a plant enzyme in the second stage. Similar techniques are indicated in the patent to be applicable to soy protein isolate, whey or whey protein and fish protein. This process requires a preparation step, a heating or conditioning step and the use of three different enzymes to effect the preparation of an organoleptically acceptable hydrolysate.

U.S. Pat. No. 4,107,334 uses a similar precipitation, technique to prepare the functional protein from microbial, or vegetable protein, or whey by hydrolysis. Generally a solution of low solids and protein content is preferably adjusted to a pH of about the isoelectric point of the protein (4–7) and heated until a large proportion of the protein (at least 50%) has been precipitated (for whey protein concentrate −90° C. for 2 minutes).

After washing, the protein is hydrolyzed using any acid, neutral or alkaline protease (fungal protease suggested).

The value of a protein hydrolysate in a special diet program depends on the degree of hydrolysis, flavor, and the ash content. The prior art processes which relate to precipitation depend upon the reaction of the protein at the isoelectric point. The agents for adjusting pH tend to increase the ash content of the final product. It would be more desirable to have a process which could operate at the native pH of the protein without the need to add pH adjustment agents and their attendant ash content.

In numerous processes, the extent of the hydrolysis reaction is extremely short to avoid extensive hydrolysis which will produce strongly flavored agents. Long hydrolysis time can pose microbiological control problems which require the addition of a preservative Some of these problems are avoided by conducting a partial hydrolysis. The use of a partial hydrolysis reaction is also favored because a more complete hydrolysis would require more time than is convenient or economical. It would be advantageous to be able to conduct the hydrolysis rapidly and more completely while avoiding flavor problems and still obtain a product which is low in ash and highly hydrolyzed.

These features can be provided in accordance with the present invention.

THE INVENTION

In accordance with the present invention, it has been found that a low ash protein product particularly adapted for hydrolysis can be prepared by gelling a dispersion of the protein to be hydrolyzed, washing the gel in particulate form in sufficient liquid and for a period of time sufficient to allow a portion of the non-proteinaceous material to defuse from the gel into the surrounding liquid, and separating the liquid. The pretreated product from this procedure can then be used to form a protein solution for hydrolysis in accordance with the teachings of the prior art.

By the formation of the gel, the protein has been able to unfold and bond between the sulfhydryl groups. This is entirely distinct from a precipitation reaction at the isoelectric point in which the sulfhydryl groups are not responsible for action. A more complete removal of protein is possible by this technique.

It has also been found that the use of a special group of enzymes in hydrolyzing a product as pretreated above provides good yield at short reaction time with limited organoleptic problems.

DETAILED DESCRIPTION OF THE PRESENT INVENTION

The instant process provides a simple and inexpensive means of separating the protein of many natural protein sources from water-soluble constituents by means of an efficient protein insolubilization step and in turn converting the separated proteins into a water-soluble form.

The process of the present invention can be successfully employed to purify proteins from any source provided that they are water-soluble and thermogelable. Animal and vegetable proteins are contemplated. In order to be gelable, the protein source must form a solution of from about 8% to about 40% and preferably from about 12% to about 20% total solids depending on the protein and from about 6% to about 30%, and preferably from about 9% to about 18% protein, the percentages being by weight based on the total of the solution. As the percent solids and protein approach the upper limits of the respective ranges, dissolving difficulties may be encountered depending on the source of the protein. Egg albumen can dissolve at 20–25% total solids while soy can dissolve at higher concentrations. These ranges are dependent on the particular nature of the protein source. Preferred among these are whey products containing at least 30% protein, egg albumen in either liquid, fresh or powdered form, whey protein and soy protein concentrates as well as undenatured fish protein.

The protein source can be selected from those which are available commercially or they can be prepared according to techniques well known to the art. Such commercially available protein include SUPRO soy isolate, whey protein concentrate (40-90% protein), egg albumen, and fish protein (e.g. Atra-Nabisco EFP-90 eviscerated fish protein). In general all of these proteins can be effectively processed. Slight deviations in the method of operation may be required depending on the peculiar nature of the protein involved.

Since the hydrolysates used in hospital diets should be as low in lactose and ash as possible to avoid digestion problems, it is preferred to utilize as the protein source for hydrolysis a material which is high in protein and low in lactose. For these reasons, egg albumen is a preferred protein source.

According to an exemplary process for pretreating egg albumen, a 10% to about 20% and preferably from about 12 to about 14% total solids solution of egg albumen (powdered or fresh egg white at native pH) at about 80–87% protein based on the weight of egg albumen powder is prepared or a total protein content based on 10 to 20% solids ranging from about 8% to about 17.4% protein. The natural pH generally ranges from about 7 and 9. This solution is heated for a sufficient time to form a gel. Temperatures of from about 65° C. to about 95° C. for about 2 minutes to about 1.5 hours depending on concentration and pH were found to be sufficient (internal temperature of protein solution being sufficient to effect gelation and for egg albumen this ranges from about 75°–80° C.). As the concentration is increased or to a lesser extent as the pH is increased, the gel temperature is reduced. The time for gelation is also dependent on the heat transfer characteristics of the system. A layer of gel between the heating element and ungelled material has a poor heat transfer characteristic. Multiple heating means, thin layer heating means and, preferably, means for breaking the gel layer can be used to avoid the necessity of a long heating period. Internal and external heating along with agitation can be used to facilitate complete gel formation. The selection of heating times for the formation of the required gel under the physical conditions of gelation used can be easily ascertained by a skilled artisan.

As used herein, a gel is intended to mean a self-standing form having a strength of at least 100 grams as determined by a Marine Colloids Gel Tester using a plunger having a diameter of 1.08 centimeters. A practical upper limit is about 2,000 grams and preferably about 1,000 grams.

Before the gel can be processed to remove the non-proteinaceous material, the gel must be reduced to a particle size sufficiently small to allow diffusion to take place conveniently. Particles ranging in size from about 0.125 to about 27 cubic centimeters are preferred for efficient diffusion. The gel can be reduced to particle size during gelation by agitation while the gel is forming. This is preferred as it has the additional advantage of improving the heat transfer characteristics of the solution as it is being gelled. The gel can also be reduced in particle size after formation, a mill or grinding device being sufficient for the purpose.

If the gelled particles exhibit a surface moisture this can be removed at this stage by any suitable means such as pressure, blotting and preferably centrifuging. The pressure exerted by centrifuging is only required to be sufficient to accomplish the separation desired. Centrifuging at from about 500 to about 1,000 gravities has been found effective. Centrifuging time is not critical, from about 10 to about 60 minutes has been found acceptable. Preferably, from about 25% to about 70% of the initial liquid in the gel is extracted.

The gelled particles, either before or after centrifuging, are washed in a sufficient amount of liquid and for a sufficient period of time to diffuse entrained non-proteinaceous substances from the gel into the surrounding liquid. The non-proteinaceous substances generally include ash, non-protein nitrogen and, in the case of whey, lactose. The wash liquid is preferably water though alcohol, dilute acids and dilute alkali can also be used. The latter two are less preferred as they can detract from the ash removal. An acid or alkaline wash may be desirable as a pH adjustment means.

The particles are washed in a sufficient amount of liquid to allow diffusion of the non-proteinacous substances. The liquid is generally used in an amount ranging from about 20% to about 200% based on the weight of the gel. Some protein systems form dryer particles or curds than others. In those cases, a larger amount of liquid is desirable. The greater the amount of liquid, the greater the difference in chemical potential between the liquid in the gel and the surrounding liquid and the faster the diffusion rate. The maximum amount of liquid is dependent on practical considerations such as cost, handling, removal and the like.

The washing is allowed to proceed to a point at which at least a portion of the non-proteinaceous substances have been extracted from the gel. Preferably at least 25% of the non proteinaceous substances are extracted at the first wash. If desired, the washing sequence can be repeated using the same or different liquid in the same or different amounts. The number of washings is governed by the amount of non-proteinaceous material to be removed. In general, one or two washings have been found to be sufficient. If more than one washing is used, it is preferred that a total of at least about 50% of the non-proteinaceous substances be removed during the washing stage.

The washing temperature is not critical, room temperature can be used if desired.

The use of precentrifugation before washing and the number of washings depends on the nature of the treated protein and the purity desired. Egg albumen forms a moist gel and is preferably centrifuged before washing. Soy protein forms a dry gel so that the gel must be washed before separation.

While centrifugation is the preferred separation technique, any means for liquid/solid separation can be used as long as the protein or the curd remains in a form which is usable for the purpose intended.

The solids after centrifugation are preferably ground or treated in such a way as to break up and reduce the particle size of the material to a uniform size for hydrolysis. Homogenization can be used for this purpose.

As an optional step, the solid matter can be subjected to pasteurization conditions. The product can also be heated to destroy any enzyme inhibitors, generally from about 65° C. to about 90° C. for a minimum of 1 minute though this has not been found to be essential for high yields.

The material obtained at this point with or without the pasteurization can then be dried or subjected to hydrolysis using standard known techniques such as outlined in U.S. Pat. Nos.3,857,966 and 4,107,334.

The pretreated protein is dispersed, generally in an aqueous medium, for hydrolysis. The concentration of protein in the dispersion is not critical and normally ranges from about 1% to about 20% and preferably from about 3% to about 9% based on the total weight of the dispersion. The particle size should be sufficiently small to accommodate efficient hydrolysis, particle sizes ranging from about $1 \times 10^{-1}$ to about $1 \times 10^{-5}$ cubic centimeters being preferred. More preferably, the particle size ranges from about $1 \times 10^{-2}$ to about $1 \times 10^{-4}$ cubic centimeters. Any hydrolysis means can be used including chemical such as acid, alkali or enzymatic, the enzymatic being preferred. Any acid, neutral or alkaline or animal or plant protease or combinations thereof can be used for hydrolysis. Any blends of enzymes can be used if desired.

The minimum level of proteolytic activity is related to the practical rate of the hydrolysis, the maximum level is determined solely by economics. A crude enzyme may require too great an amount to provide a practical hydrolysis rate whereas a highly purified enzyme can be too expensive for practical use. A practical operating range for the proteolytic enzyme level can be easily determined by a skilled artisan.

The temperature and the pH of the hydrolysis will depend upon the nature of the protein hydrolyzed and the proteolytic enzyme employed, and are selected to optimize the conversion of the denatured protein to hydrolysate. Convenient temperatures range from about 20° to 65° C. Below 20° C., the hydrolysis proceeds at a rather slow rate, while at temperatures above 65° C. the enzyme may be inactivated. The optimum temperature normally ranges from about 40° C. to about 55° C.

At the completion of the hydrolysis reaction, the resulting hazy to clear protein solution is treated to inactivate the enzyme. The method of treatment will depend upon the nature of the enzyme, but the inactivation is usually accomplished by heating the reaction solution to from about 75° to 100° C. for from about 1 to 60 minutes. Depending on the enzyme employed, such treatment may be accompanied by a pH adjustment (pH 6-8 being preferred).

It has also been found that the use of a combination of fungal protease and pancreatin as disclosed in copending application Ser. No. 680,224, filed Dec. 12, 1984 which is a continuation of Ser. No. 350,800 filed Feb. 22, 1982, now abandoned, entitled PROCESS FOR THE PREPARATION OF PROTEIN HYDROLYSATES in the names of N. Melachouris, C. Lee and C. F. Lin provides a fast and efficient enzyme system for hydrolyzing a proteinaceous material prepared by the aforementioned pretreatment process. The hydrolysis reaction can be completed in a shorter time at a higher degree of digestion thereby avoiding flavor and microbiological contamination problems. The product, especially after a post-clarification treatment is a clear solution high in short chain peptides, low in ash and has good organoleptic properties.

The fungal protease can be derived from the genus Aspergillus illustrated by *A. oryzae, A. flavus, A. niger,* and particularly *A. oryzae.* Known enzyme preparations from *A. oryzae* are mixtures of acid, neutral and alkaline proteases demonstrating both exopeptidase and endopeptidase activity on protein molecules. The activity of fungal protease is generally within the range of from about 1,000 to about 100,000 and preferably from about 8,000 to about 20,000 hemoglobin units per gram of protein in the initial protein material. One hemoglobin unit is that amount of enzyme which will liberate 0.0447 mg. of non-protein nitrogen in 30 minutes. The optimum temperature for effective use of the fungal protease from *A. oryzae* ranges from about 40° C. to about 60° C. and preferably from about 45° C. to about 55° C.

The pancreatin is a protease enzyme pancreas extract which can be obtained from porcine, ovine or bovine. The proteolytic enzymes in the pancreatin are principally trypsin, chymotrypsin (A, B and C), elastase, and carboxypeptidase (A and B). The pancreatin should be processed such that at least about 70% of the endo- and exopeptidase extracted from the pancreas is in the pancreatin. The protease activity for the pancreatin can range from about 1,000 to about 100,000 and preferably from about 8,000 to about 20,000 N.F. units per gram of protein in the initial protein material. One N.F. unit of protease activity is contained in that amount of pancreatin that digests 1 milligram of casein under the conditions of the N.F. Assay for the activity of the enzyme. The optimum pH range for use depends on the enzyme activity desired. The optimum pH for trypsin ranges from about pH 7 to about 9. Optimum temperature range for use is up to 50° C. (preferably about 40° C. to about 50° C.).

The units used herein to express the activity of proteases are well known to the art and are clearly defined in such references as the First Supplement to the Food Chemical Codex, second Edition, 1974.

The fungal protease is used in a ratio to the pancreatin within the range of about 1:1 to 1:5, and preferably from about 1:3 to about 1:4. This is the ratio of the total amount of fungal protease to pancreatin used in the hydrolysis. The hydrolysis can be conducted using a one or two stage introduction of the enzyme. The proteinaceous material can be partially hydrolyzed with fungal protease and, after heat inactivation, further hydrolyzed with pancreatin alone or preferably with a combination of fungal protease and pancreatin. In this case the ratio of fungal protease to pancreatin added in the second stage ranges from about 1:1 to about 1:5, the total ratio of fungal protease to pancreatin being as given hereinbefore. The proteinaceous material can also be hydrolyzed using only the combination of fungal protease and pancreatin. To avoid one enzyme from hydroltzing the other, the enzymes are usually added separately allowing about 1 minute for the first enzyme (fungal protease) to establish itself before addition of the second (pancreatin).

In the two step hydrolysis, the first stage is allowed to proceed for at least 5 hours and preferably from about 6 to about 8 hours though longer times can be used if desired. The second stage is allowed to proceed for a period of time sufficient to provide the degree of hydrolysis desired, usually from about 12 to about 17 hours. In the single stage hydrolysis, the reaction can be allowed to proceed for at least 6 hours and preferably from about 6 to about 8 hours. The period of time is related to the degree of hydrolysis desired, lower periods of time producing lower degrees of hydrolysis.

At the conclusion of the first stage or the second stage, the enzymes are inactivated by known procedures usually by heating, e.g. 90° C. for 5–10 minutes or 75° C. for 30–60 minutes and variations thereof. A combination of pH and temperature adjustments may be used for inactivation when the use of high temperatures is undesirable. After cooling, the product can be dried, used as is or further processed to improve clarity such as by filtering. It has also been found desirable to incorporate an adsorbent such as activated carbon or bentonite in an amount ranging from about 25% to about 200% (by weight based on the weight of the protein used to prepare the hydrolysate) in the liquid to improve flavor and color. After separation of the adsorbent (filtration and/or centrifugation), the hydrolysate can be dried by any suitable means such as freeze drying or spray drying.

The hydrolysate, either before separation or after separation and/or drying, can be employed in a wide variety of food substrates to increase the nutritional value thereof. For example, the hydrolysates can be used in dry beverage mixes, soft drinks, fruit juices, flavored liquid beverages and the like with no adverse effects on the organoleptic characteristics of the beverages. The most direct use of the hydrolysate is in a liquid special diet. This generally takes the form of a flavored emulsion with characteristics of a milk shake. A frozen slush can also be prepared containing the hydrolysate.

As used herein all percentages are by weight based on the weight of the composition referred to unless otherwise stated.

Protein amounts are determined by the Kjeldahl method.

The invention will be further illustrated in the Examples which follow.

EXAMPLE 1

Preferred Embodiment

A commercial powdered egg albumen was pretreated in accordance with the following procedure:

1200 grams of commercial dried egg albumen were dissolved in water to provide a solution having 14% by weight egg albumen (pH 7.4). The solution was occasionally agitated and heated to an internal temperature of between 75° and 80° C. for about 1 hour until a gel was formed. While forming a hard gel, the gel was broken by stirring with a spatula. After the hard gel was formed, it was centrifuged. The supernatant (serum) was discarded and the curd was admixed with a volume of water equivalent to that of the discarded serum. After agitation for about 30 minutes, the mixture of water and curd was recentrifuged. The supernatant (wash water) was discarded. The curd was reconstituted in water to a level of 6% solids and homogenized. By this pretreatment, the total solids loss from the original egg albumen was from about 10% to about 12%, and about 70% of the ash was removed from the egg albumen. The discarded serum and wash water combined contained 22% ash and 8.1% nitrogen on solids basis. Of the 8.1% nitrogen in the serum and wash water, 7.3% nitrogen was nonprotein nitrogen which was soluble in 15% trichloroacetic acid. Since there was a total of about 1% nitrogen loss by pretreatment, true protein loss by the pretreatment was minimal.

The pretreated egg albumen solution (6% solids) was hydrolyzed enzymatically according to the following procedure. For comparison, powdered egg albumen from the same source was dissolved in water to provide a control solution having 6% egg albumen by weight. Both the pretreated and control egg albumen solutions were pasteurized by heating to 65° C. and cooled to about 50° C. To each solution were added 0.15% (W/V) commercial fungal protease and 0.45% (W/V) commercial pancreatin. The fungal protease had an activity of 384,000 hemoglobin units per gram which is equivalent to 11,707 hemoglobin units per gram of protein in the initial egg albumen. The pancreatin contained 100 N.F. units per milligram which is equivalent to 9,146 N.F. units per gram of protein in the initial egg albumen. Each solution containing both enzymes was incubated for 7 hours at 50° C. with stirring During digestion, aliquots of the digest were removed from each solution for analysis. Ten milliliters of each aliquot were admixed with 10 milliliters of 30% trichloroacetic acid solution. After mixing completely, the mixture was centrifuged at about 900 gravities for 30 minutes. The supernatant was discarded and the precipitated material was dried in a 100°–110° C. oven for about 15 hours. The amount of the dried precipitated material was weighed. The amount of precrpitation represents the amount of unhydrolyzed proteins and incompletely hydrolyzed peptides with greater than about 1400 molecular weight. After 7 hours of incubation, both the pretreated and control egg albumen solutions were heated to 90° C. for enzyme inactivation and compared with each other for turbidity and appearance of precipitate. The results are shown in Tables I and II.

TABLE I

Change in the amount of unhydrolyzed proteins and incompletely hydrolyzed peptides as a function of incubation time.

| | Percent Weight of Unhydrolyzed Proteins and Incompletely Hydrolyzed Peptides based on the Weight of Starting Egg Albumen Solids | |
|---|---|---|
| Incubation Time (Hours) | Pretreated Egg Albumen Solution | Control - Unpretreated Egg Albumen Solution |
| 4 | 23 | 84 |
| 6 | 17 | 59 |
| 7 | 16 | 50 |

TABLE II

Turbidity and appearance of the digest solution after 7 hours of incubation and enzyme inactivation.

| | Pretreated Egg Albumen Solution | Control - Unpretreated Egg Albumen Solution |
|---|---|---|
| Turbidity | relatively clear | white, paste like turbid solution |
| Height of precipitate after holding digest solution for 24 hours in a refrigerator - solution height 10 cm | 1.2 cm | 4.9 cm |

EXAMPLE 2

A soy protein isolate (powder) was prepared from a commercial soy flour following the commercial isolation process as outlined in J. of Am. Oil Chemist's Society, Vol. 58(3), 1981, p. 334, FIG. 2. 108 grams of the soy protein isolate was dispersed in water to provide a solution having 18% solids by weight. The solution was heated in a 97° C. water bath with occasional stirring until a hard gel was formed. The gel was broken into small pieces and was admixed with 300 milliliters water. This solution was centrifuged about 900 gravities for 30 minutes. After the centrifugation, the supernatant (wash water) was discarded and the curd was reconstituted in water to 6% solids. The solution containing the 6% soy protein isolate curd was homogenized to break the curd into small particles using a polytron homogenizer (from Brinkman Instruments).

For comparison purposes, soy protein isolate (powder) from the same source was dispersed in water to provide a control solution having 6% solids by weight.

Both the pretreated solution (6% solids) and control solution (6% solids) were hydrolyzed enzymatically following the procedure described in Example 1. During digestion, aliquots of the digest were removed from each solution for analysis. Ten milliliters of each aliquot was combined with 10 milliliters of 30% trichloroacetic acid solution. The amount of precipitation from each aliquot was determined following the procedure described in Example 1. The results are shown in Table III.

TABLE III

Change in the amount of unhydrolyzed proteins and incompletely hydrolyzed peptides as a function of incubation time.

| | Percent Weight of Unhydrolyzed Proteins and Incompletely Hydrolyzed Peptides based on the Weight of Starting Soy Protein Isolate | |
|---|---|---|
| Incubation Time (Hours) | Pretreated Soy Protein Isolate | Control - Unpretreated Soy Protein Isolate |
| 2 | 22 | 65 |
| 4 | 10 | 47 |
| 7 | 7 | 45 |

EXAMPLE 3

1200 grams of commercial egg albumen powder was pretreated and enzymatically hydrolyzed following the procedure described in Example 1. After 7 hours of incubation, the hydrolysate was heated to 90° C. for enzyme inactivation and was then freeze dried. Solids recovery was 87.7%, indicating that 12.3% solids of the starting egg albumen solids was lost during the pretreatment. Nitrogen and ash contents of the dried hydrolysate were 12.9% and 3.4% by weight respectively. Percent α-amino nitrogen content of the dried hydrolysate was determined according to the procedure described in U.S. Pharmacopeia National Formulary, USP XX, 1980, p. 688. The percent α-amino nitrogen was 48.1% of total nitrogen. The hydrolysate quickly dispersed in water, but exhibited slight precipitation in both water and 15% trichoroacetic acid solution and also exhibited a slight bitterness.

EXAMPLE 4

600 grams of commercial egg albumen powder was pretreated and enzymatically hydrolyzed following the procedure described in Example 1. After 7 hours of incubation, the hydrolysate was heated to 90° C. and cooled immediately for enzyme inactivation. After cooling, a diatomaceous earth filtering aid (1%, W/V; Celite No. 545; Johns Manville Products Corp.) was added to the hydrolysate. The mixture of the hydrolysate and the filtering aid was filtered through a Seitz Pressure filtering apparatus (Model No. 14) equipped with a Seitz No. 5–88 filter media. The filtrate was freeze dried. Solids recovery was 80.0% and they contained 12.8% nitrogen and 6.3% ash. The percent α-amino nitrogen content was 53.6% of total nitrogen. The hydrolysate quickly dispersed in water, but exhibited slight precipitation. However, the precipitate went into solution completely resulting in a clear solution when the solution was warmed to 65° C. and cooled to room temperature. This indicates that the precipitation is non-covalent in nature and is possibly due to crystallization of amino acids and small peptides. The freeze dried hydrolysate was completely soluble in 15% trichloroacetic acid and exhibited trace bitterness.

EXAMPLE 5

600 grams of commercial egg albumen powder was pretreated and enzymatically hydrolyzed following the procedure described in Example 1. After 7 hours of incubation, the hydrolysate was heated to 90° C. for enzyme inactivation. After cooling, 300 grams of commercial activated carbon (Nuchar S-A) was added to the hydrolysate. The mixture of the hydrolysate and activated carbon was held for 1 hour at room temperature under agitation. Then, the mixture was filtered through a Seitz Pressure filtering apparatus as in Example 4. The filtrate was freeze dried. Solids recovery was 69.7% and it contained 12.7% nitrogen and 6.3% ash. The percent α-amino nitrogen content was 56.7% of total nitrogen. The hydrolysate was completely soluble in water and 15% trichloroacetic acid solution. When the hydrolysate was dissolved to 5% solids in water, it showed almost no color and was clear. The solution was organoleptically bland with little to no bitter aftertaste.

EXAMPLE 6

Egg albumen was hydrolyzed according to the procedure outlined in U.S. Pat. No. 3,857,966. Egg albumen powder was dispersed in water to the 5% solids level as disclosed in the patent and the pH adjusted to 6.35. For comparison purposes, egg albumen of the 14% solids level as used in Example 1 was dispersed in water at pH 6.3. These solutions were heated to 85° C. for 5 minutes. The 5% solution formed precipitates whereas the 14% solution formed a very soft gel. After cooling to room temperature, both solutions were centrifuged, washed with water at pH 6.35, homogenized in a home blender (Waring) and centrifuged. The solids were suspended in water at 5% solids. The product prepared from the 5% solution lost 28% of the original starting material, and the 14% solution lost 20%. In comparison, the product of Example 1 lost only 10 to 12% of the total solids.

The pH of a portion of the dispersion prepared from the 5% solution and of the soft gel formed from the 14% solution were each adjusted to pH 8.5 and heated to 95°-100° C. for 15 minutes to condition the protein.

The dispersion containing conditioned protein and similar unconditioned dispersions (from the 5% and 14% solutions with no pH adjustment and heating) were hydrolyzed using an alkaline microbial protease (Alkalase from Novo Labs) in a first stage and a neutral microbial protease (Nutrase from Novo Labs) and papain (papain 30,000 from Miles Lab.) in the second stage as outlined in the patent. The formol titration value (J. Fd. Sci., 39:379, 1974) of the conditioned samples was 0.46 and 0.45 milliliters 0.1N. NaOH respectively (essentially the same) and 0.6 and 0.58 milliliters 0.1N. NaOH for the unconditioned samples. Essentially no difference was seen between the two sets. In contrast, a hydrolysate prepared as in Example 1 using 5% protein was from about 3 to about 5 milliliters 0.1N. NaOH. This indicates that the rate of hydrolysis using the enzyme system of the invention is significantly faster than that disclosed in U.S. Pat. No. 3,857,966.

What is claimed is:

1. A process which comprises:
   (a) heating a dispersion of a gelable proteinaceous material wherein the solids content of said dispersion ranges from about 12% to about 40% by weight and the protein content of said dispersion ranges from about 9% to about 30% by weight to a temperature for a period of time and under conditions sufficient to form a gel having a gel strength of at least 100 grams;
   (b) washing the gel in particulate form in sufficient liquid and for a period of time sufficient to allow a portion of the non-proteinaceous material entrained in the gel to diffuse from the gel into the surrounding liquid; and
   (c) separating the liquid, the protein product of Steps (a), (b) and (c) being adapted for enzymatic hydrolysis.

2. The process as recited in claim 1 wherein said proteinaceous material is vegatable protein.

3. The process as recited in claim 2 wherein said vegatable protein is soy.

4. The process as recited in claim 1 wherein said proteinaceous material is animal protein.

5. The process is recited in claim 4 wherein said protein is egg albumen.

6. The process as recited in claim 4 wherein said protein is a dairy protein.

7. The process as recited in claim 4 wherein said protein is fish protein.

8. The process as recited in claim 1 wherein said solids content ranges from about 12% to about 20% by weight and the protein content ranges from about 9% to about 18% by weight.

9. The process as recited in claim 1 wherein a dispersion of a gelable proteinaceous material in water is formed having a solids content ranging from about 12 to about 40% and a protein content ranging from about 9 to about 30%; said disperion is heated to a temperature ranging from about 65° to about 95° C. for a period of time sufficient to form a gel having a gel strength of from about 100 to about 2000 grams, extracting from said gel after breaking said gel into particles from about 25% to about 70% of the initial liquid from the gel, washing the gel particles, and extracting the wash liquid from the gel particles.

10. The process as recited in claim 9 wherein the proteinaceous material is egg albumen, the solids content ranges from about 12% to about 20%, the dispersion is heated to an internal temperature ranging from about 75° to about 80° C. for about 2 minutes to about 1.5 hours and sufficient to form a gel having a gel strength of at least 100 grams.

11. The process as recited in claim 1 wherein the curd is washed and the wash liquid extracted.

12. The process as recited in claim 1 which further includes the step of hydrolyzing the protein adapted for enzymatic hydrolysis.

13. The process as recited in claim 1 which further includes the step of enzymatically hydrolyzing the protein adapted for enzymatic hydrolysis with fungal protease and pancreatin.

14. The process as recited in claim 1 which further includes the steps of reacting the protein adapted for enzymatic hydrolysis with fungal protease, heating to inactivate the fungal protease, and reacting the proteain with fungal protease in combination with pancreatin.

15. The process as recited in claim 1 which further includes the step of hydrolyzing the protein adapted for enzymatic hydrolysis with fungal protease in combination with pancreatin.

16. The process as recited in claim 13 wherein the ratio of fungal protease to pancreatin ranges from about 1:1 to about 1:5.

17. The process as recited in claim 14 wherein the ratio of fungal protease to pancreatin ranges from about 1:1 to about 1:5 and the fungal protease is used in the first stage such that the total ratio of fungal protease to pancreatin is within the range of from about 1:1 to about 1:5.

18. The process as recited in claim 13 wherein the product of hydrolysis is treated with an absorbent to purify the product.

19. The process as recited in claim 18 wherein the product of hydrolysis is treated with activated carbon.

20. The product of claim 1.

21. A process comprising:
   (a) heating a dispersion of egg albumen having a solids content ranging from about 12 to about 20% and a protein content ranging from about 9 to about 17.4% for a period of time ranging from about 2 min. to about 1.5 hours and at an internal temperature ranging from about 75° to about 80° C., said time being sufficient to form a gel having a gel strength ranging from about 100 to about 2000 grams;
   (b) breaking the gel into particles ranging from about 0.125 to about 27 cubic centimeters;
   (c) extracting at least 25% of the liquid contained in the gel particles; and
   (d) washing the gel particles and extracting the wash liquid from the gel particles, the protein product of Steps (a)-(d) being adapted for enzymatic hydrolysis.

22. The process as recited in claim 21 which further includes the steps of:
   (a) dispersing the product of Step (d) in water to form a dispersion having from about 3% to about 9% protein; and (b) enzymatically hydrolyzing the protein with fungal protease and pancreatin.

23. The process as recited in claim 22 wherein the enzymatically hydrolyzed protein is post-treated in solution with activated carbon.

24. The product of claim 21.

25. The process as recited in claim 15 wherein the ratio of fungal protease to pancreatin ranges from about 1:1 to about 1:5.

26. The product of claim 13.

27. The process as recited in claim 9 which further includes the step of enzymatically hydrolyzing the protein adapted for enzymatic hydrolysis with fungal protease and pancreatin.

28. The process as recited in claim 10 which further includes the step of enzymatically hydrolyzing the protein adapted for enzymatic hydrolysis with fungal protease and pancreatin.

29. The process as recited in claim 9 which further includes the steps of reacting the protein adapted for enzymatic hydrolysis with fungal protease, heating to inactivate the fungal protease, and reacting the protein with fungal protease in combination with pancreatin.

30. The process as recited in claim 10 which further includes the steps of reacting the protein adapted for enzymatic hydrolysis with fungal protease, heating to inactivate the fungal protease, and reacting the protein with fungal protease in combination with pancreatin.

31. The process as recited in claim 9 which further includes the step of hydrolyzing the protein adapted for enzymatic hydrolysis with fungal protease in combination with pancreatin.

32. The process as recited in claim 10 which further includes the step of hydrolyzing the protein adapted for enzymatic hydrolysis with fungal protease in combination with pancreatin.

33. The product of claim 10.
34. The product of claim 19.
35. The product of claim 22.
36. The product of claim 23.

* * * * *